(12) United States Patent
Kuroyanagi et al.

(10) Patent No.: US 6,540,050 B2
(45) Date of Patent: Apr. 1, 2003

(54) DISC BRAKE

(75) Inventors: Noboru Kuroyanagi, Toyota (JP); Ryoichi Kurasako, Aichi-ken (JP); Masahiko Nakajima, Toyota (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/908,683

(22) Filed: Jul. 20, 2001

(65) Prior Publication Data

US 2002/0020590 A1 Feb. 21, 2002

(30) Foreign Application Priority Data

Jul. 21, 2000 (JP) ........................................ 2000-221167

(51) Int. Cl.$^7$ ............................................... F16D 65/38
(52) U.S. Cl. ............................................ 188/73.45
(58) Field of Search ........................... 188/73.44, 73.45

(56) References Cited

U.S. PATENT DOCUMENTS

| | | | | |
|---|---|---|---|---|
| 4,061,209 A | * | 12/1977 | Gee et al. ................. | 188/73.36 |
| 4,068,745 A | * | 1/1978 | Haraikawa ................ | 188/73.45 |
| 4,630,713 A | * | 12/1986 | Carre et al. .............. | 188/73.39 |
| 4,781,273 A | * | 11/1988 | Fujinami .................. | 188/73.42 |
| 5,526,904 A | * | 6/1996 | Walden et al. ........... | 188/73.44 |
| 5,657,837 A | * | 8/1997 | Yamadera et al. ....... | 188/73.42 |
| 5,785,156 A | * | 7/1998 | Warwick et al. ......... | 188/73.32 |
| 5,931,267 A | * | 8/1999 | Iwata et al. .............. | 188/73.44 |
| 6,223,867 B1 | * | 5/2001 | Doi et al. .................. | 188/72.4 |

FOREIGN PATENT DOCUMENTS

GB        1 500 907        2/1978

* cited by examiner

Primary Examiner—Christopher P. Schwartz
Assistant Examiner—Devon C Kramer
(74) Attorney, Agent, or Firm—Burns, Doane, Swecker & Mathis, LLP

(57) ABSTRACT

In a disc brake in which the caliper is supported by a mounting slidably in the axial direction of the rotor via a pair of pin sliding means, the pin sliding means is such that a center of the caliper side axial portions (i.e. collars) mounted rotatably and integrally movably in the axial direction in insertion holes of the caliper is eccentric with respect to the center of the mounting side axial portions (i.e. slide pins) fitted rotatably and slidably in the axial direction into the installation holes in the mounting.

9 Claims, 4 Drawing Sheets

DISC BRAKE

BACKGROUND OF THE INVENTION

1. Field of the Invention

The present invention relates to a disc brake, more particularly to a disc brake in which a caliper is supported by a mounting slidably in the axial direction of the rotor via a pair of pin sliding means.

2. Description of Related Art

An example of this kind of disc brake is disclosed in UKP No. 1500907. According to this example, one of the pin sliding means is mounted in an installation hole in the caliper via a cylindrical elastic member. This structure enables elastic deformation of the elastic member to absorb dimensional tolerance between the installation hole of the caliper and the installation hole in the mounting and deformation of the mounting generated during braking.

However, in the aforementioned conventional disc brake, transitional change (i.e. permanent set in fatigue) of the elastic member may make the disc brake unable to obtain the predetermined function. In addition, when the caliper is pulled in the rotational direction of the rotor in accordance with braking (i.e. when the caliper is deformed in the direction of twist), a large twist is generated on the side where no elastic member is used, inhibiting smooth sliding at the pin sliding means.

SUMMARY OF THE INVENTION

In order to solve the aforementioned problems, the present invention provides a disc brake in which the caliper is supported by the mounting slidably in the axial direction of the rotor via a pair of pin sliding means, characterized in that the pin sliding means is such that the caliper side axial portion mounted in an installation hole in the caliper rotatably and integrally movably in the axial direction is off-centered from the mounting side axial portion fitted into the installation hole in the mounting rotatably and slidably in the axial direction.

In this case, it is preferable that the eccentric amount at one of the pin sliding means is different from that at another pin sliding means, or that the installation hole in the caliper is brought into contact in a circular line with the caliper side axial portion of the pin sliding means, or that the disc brake further comprises urging means for urging the caliper in the diametrical direction of the rotor.

In the aforementioned disc brake according to the present invention, rotation of each pin sliding means with respect to the caliper and the mounting enables each pin sliding means to rotatably displace the center of the caliper side axial portion with respect to the center of the mounting side axial portion, whereby the dimensional tolerance between the pitch between both installation holes in the caliper and the pitch between both installation holes in the mounting can be absorbed in the range of eccentric amounts of both pin sliding means. This allows the clearance at a fitting portion between each installation hole in the mounting and the mounting side axial portion to be set small so as to improve slidability at each fitting portion without having to consider each of the dimensional tolerances above. In addition, even in the case where the pitch between both installation holes in the mounting changes due to deformation of the mounting during braking , as i n the case where the aforementioned tolerance is absorbed, the pitch between both pin sliding means can be changed accordingly along with the dimensional tolerance.

In the aforementioned disc brake according to the present invention, the aforementioned effect is achieved by employing each pin sliding means in which the caliper side axial portion mounted in the installation hole in the caliper rotatably and integrally movably in the axial direction is off-centered from the mounting side axial portion fitted into the installation hole in the mounting rotatably and slidably in the axial direction. Since no transitional change occurs between each sliding means and the caliper and mounting, the initial function can be obtained for a long period of time.

According to a preferred form of the present invention, an eccentric amount at one pin sliding means is different from that at another pin sliding means. In this case, the caliper is moved to one side in the diametrical direction of the rotor with respect to the mounting when the pitch between both installation holes in the mounting changes due to deformation of the mounting during braking. Therefore, behavior of the caliper with respect to the mounting during braking can be properly set by appropriately setting an eccentric amount at each pin sliding means.

According to another preferred form of the present invention, the installation hole in the caliper is brought into contact, in a circular line, with the caliper side axial portion of the pin sliding means. In this case, the pin sliding means can be moved to one side at the caliper side axial portion, and dimensional tolerance and deformation due to braking in the direction of twist (i.e. the direction in which the caliper is twisted due to braking force) can also be absorbed. Therefore, even in the case where the caliper is pulled in the rotational direction of the rotor in accordance with braking (i.e. when the caliper is deformed in the direction of twist), no major twist is generated at each pin sliding means, such that smooth sliding in the pin sliding means is ensured.

According to yet another preferred form of the present invention, urging means is provided for urging the caliper in the dimensional direction of the rotor. In this case, it is possible to prescribe the initial position (i.e. a position when no braking is applied) with respect to the mounting, to stabilize behavior of the caliper with respect to the mounting during braking, and thus obtain stable braking force.

DETAILED DESCRIPTION OF PREFERRED EMBODIMENTS

Figure 1:
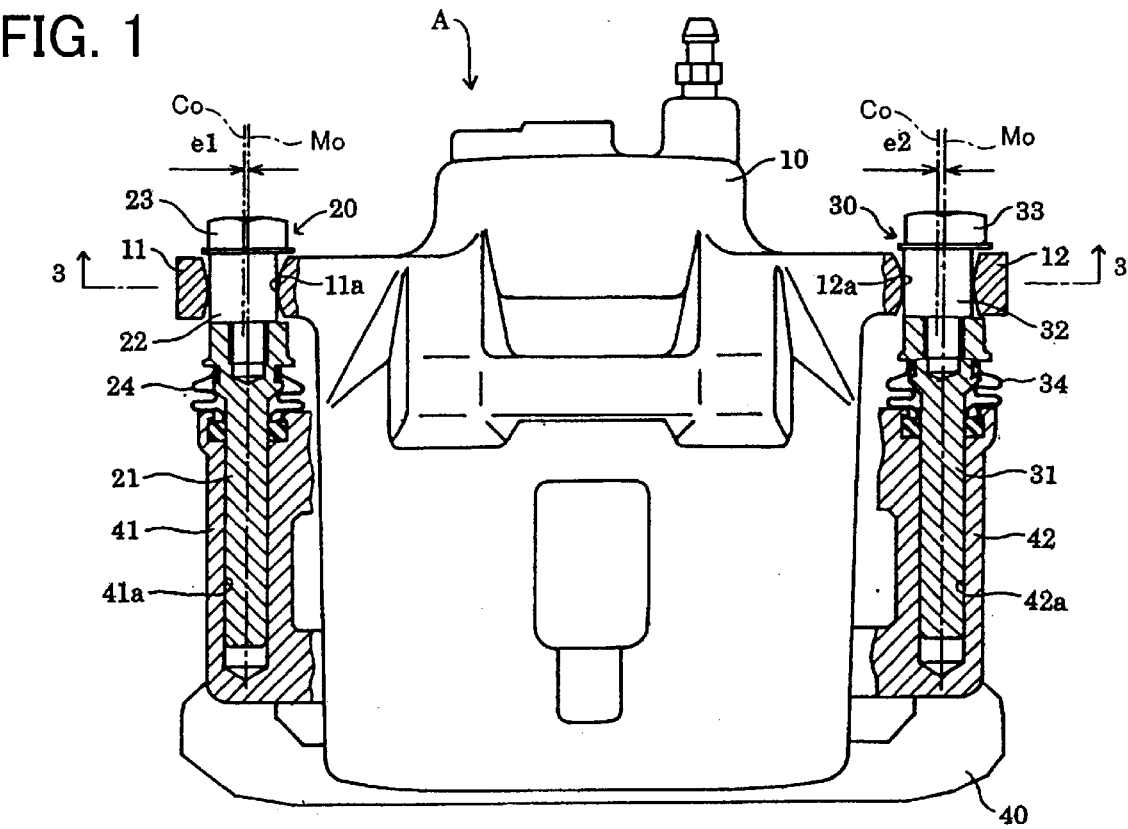
FIG. 1 is a partial broken plan view schematically illustrating one embodiment of the disc brake according to the present invention.

Hereinafter, an embodiment of the present invention will be explained with reference to the drawings. FIG. 1 schematically shows a disc brake A according to the present invention. In the disc brake A, a caliper 10 is supported at both arm portions 11, 12 by both supporting portions 41, 42 of a mounting 40 via a pair of pin sliding means 20, 30 so as to be slidable in the axial direction of the rotor. Other structures of the caliper 10 except the arm portions 11, 12, and of the mounting 40 except the supporting portions 41, 42 are known, therefore, the explanation thereof shall be omitted.

Figure 2:
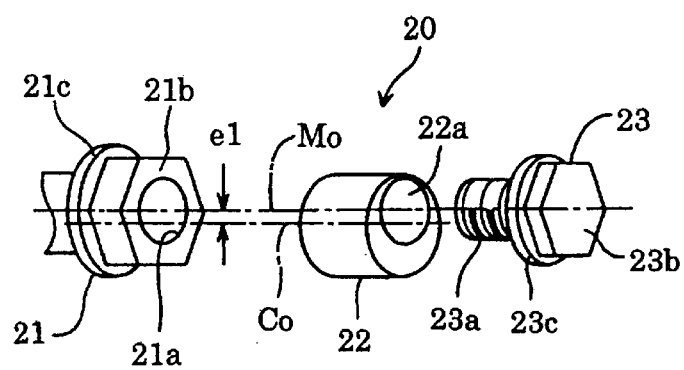
FIG. 2 is a perspective view of the essential portion of one of the pin sliding means illustrated in FIG. 1.

As shown in FIGS. 1 and 2, one of the pin sliding means 20 is provided with a slide pin 21 rotatably and fitted slidably in the axial direction in an installation hole 41a provided in the supporting portion 41 of the mounting 40; a collar 22 mounted rotatably and integrally movably in the axial direction in an installation hole 11a provided int he arm portion 11 of the caliper 10; and a pin bolt 23 for integrally connecting the slide pin 21 and the collar 22. Further, an eccentric amount of an axial center Co (i.e. the caliper side axial portion center) with respect to an axial center Mo (i.e. the mounting side portion center) of the slide pin 21 is set as e1. A pin boot 24 for sealing is attached to the outer periphery of a portion projecting from the installation hole 41a of the slide pin 21.

As shown in FIG. 2, the slide pin 21 is provided with a female thread portion 21a, a hexagonal portion 21b, and a circular flange 21c. The collar 22, formed in a cylindrical shape, has an off-centered bolt insertion hole 22a, and the pin bolt 23 has a male thread portion 23a, a hexagonal portion 23b, and a circular flange 23c. In addition, as shown in FIG. 1, small gaps are formed between the hexagonal portion 21b of the slide pin 21 and the caliper 10, and between the circular flange 23c of the pin bolt 23 and the caliper 10, allowing the caliper 10 to move to one side at the collar 22.

Another pin sliding means 30 is provided with a slide pin 31 (which is formed to have the same shape as the slide pin 21) rotatably and fitted slidably in the axial direction in an installation hole 42a provided in the supporting portion 42 of the mounting 40; a collar 32 (which is formed to have the same shape as the collar 22 except that the bolt insertion hole 22a has a different eccentric amount from the collar 22) mounted rotatably and integrally movably in the axial direction in an installation hole 12a provided in the arm portion 12 of the caliper 10; and a pin bolt 33 (which is formed to have the same shape as the slide bolt 23) for integrally connecting the slide pin 31 and the collar 33. Further, an eccentric amount of an axial center Co (i.e. the caliper side axial portion center) with respect to the axial center Mo (i.e. the mounting side portion center) of the slide pin 31 is set as e2 (where e2>e1). A pin boot 34 for sealing is attached tot he outer periphery of a portion projecting from the installation hole 42a of the slide pin 31.

Figure 3:
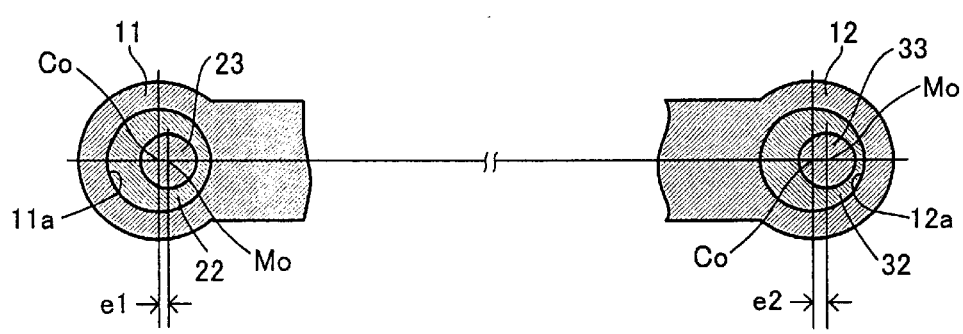
FIG. 3 is a sectional view of the essential portion taken on line 3—3 in FIG. 1.

In addition, in the disc brake A shown in FIG. 1, inner peripheral surfaces at both installation holes 11a, 12a in the caliper 10 are formed in an hourglass shape. Further, installation holes 11a, 12a in the caliper 10 are brought into contact with collars 22, 32 (i.e. the caliper side axial portion) of pin sliding means 20, 30 in a circular line as shown in FIGS. 1 and 3. In addition, it is possible to form inner peripheral surfaces of both installation holes 11a, 12a in a cylindrical shape, and outer peripheral surfaces of the collars 22, 32 in an hourglass shape so that they are brought into contact with each other in a circular line.

Figure 4:
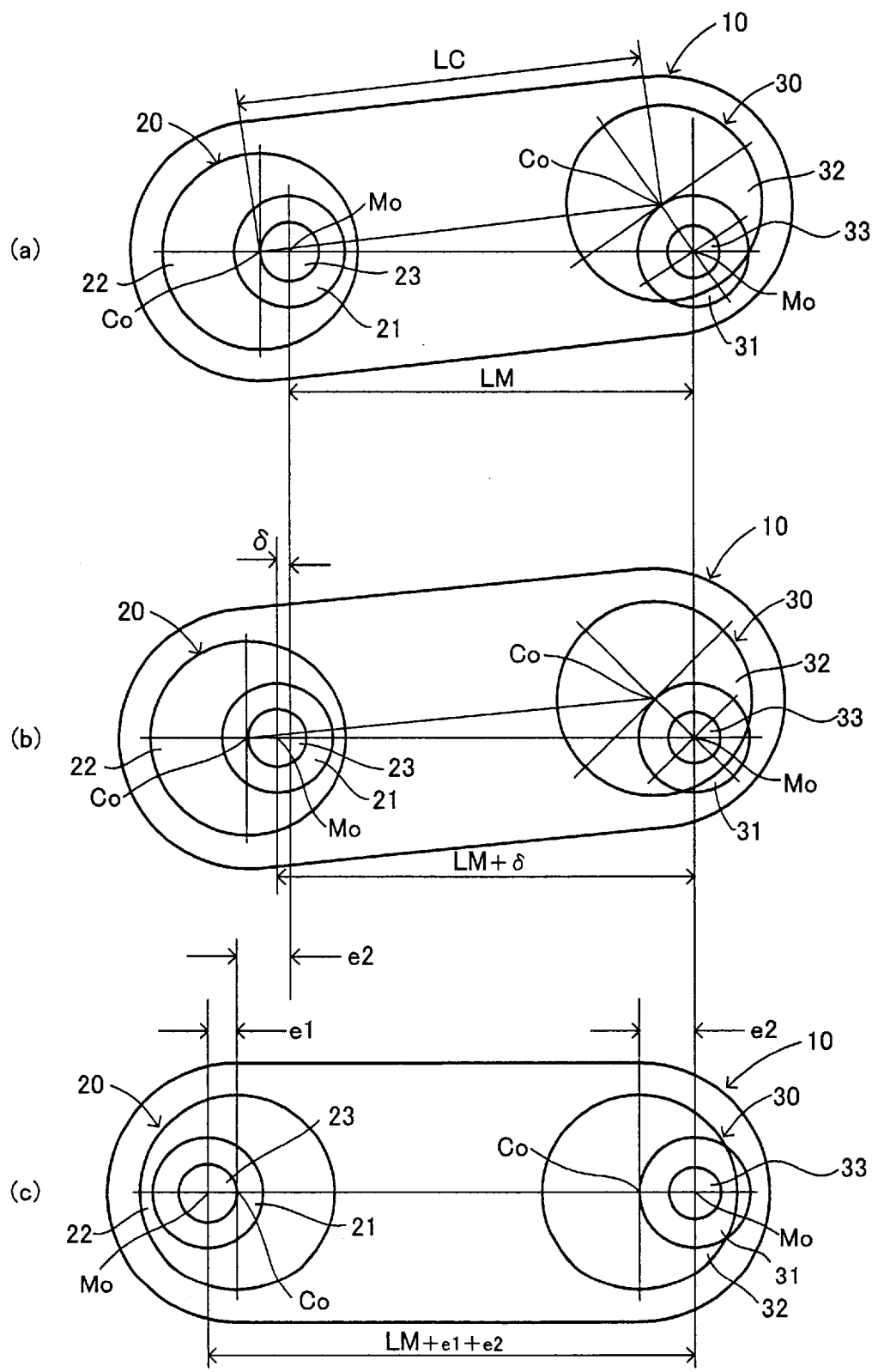
FIG. 4 is an explanatory view of action of the disc brake in FIG. 1.

In this embodiment structured as above, as apparent from (a) of FIG. 4 which is schematically shown, rotation of each slide pin 21, 31 with respect to the mounting 40 at each sliding means 20, 30 and rotation of each collar 22, 32 with respect to the caliper 10 enable the center Co of the collars 22, 32, (at the caliper side axial portion) to be rotatably displaced with respect to the center Mo of the slide pins 21, 31 (at the mounting side axial portion) at the sliding means 20, 30. Therefore, the dimensional tolerance of a pitch LC between both installation holes 11a, 12a in the caliper 10 and a pitch LM between both installation holes 41a, 42a in the mounting can be absorbed within the range of the total eccentric amounts (e1+e2) of both pin sliding means 20, 30 (i.e. the range where the value shown in (c) of FIG. 4 is set as the maximum value).

Therefore, the clearance at the fitting portion between each slide pin 21, 31 and each installation hole 41a, 42a can be set small without having to consider each of the foregoing dimensional tolerances, thereby improving slidability at each fitting portion. In addition, as apparent from (b) of FIG. 4, even in the case where the pitch LM between both installation holes 41a, 42a in the mounting 40 changes (i.e. increases by δ), as in the case where the aforementioned tolerance is absorbed, the pitch between both pin sliding means 20, 30 changes accordingly in a range of the total eccentric amounts (e1+e2) of both pin sliding means 20, 30 along with the dimensional tolerance.

In the disc brake A according to the present embodiment, the aforementioned effect is achieved by employing each pin sliding means 20, 30, in which the center Co of the collars 22, 32 mounted rotatably and integrally movably in the axial direction in the installation holes 11a, 12a of the caliper 10 are eccentric with respect to the center Mo of the slide pins 21, 31 fitted rotatably and slidably in the axial direction into the installation holes 41a, 42a in the mounting 40. Therefore, no transitional change occurs between each pin sliding means 20, 30 and the caliper 10, and the mounting 40, and thus the initial function can be consistently obtained for a long period of time.

Figure 5:
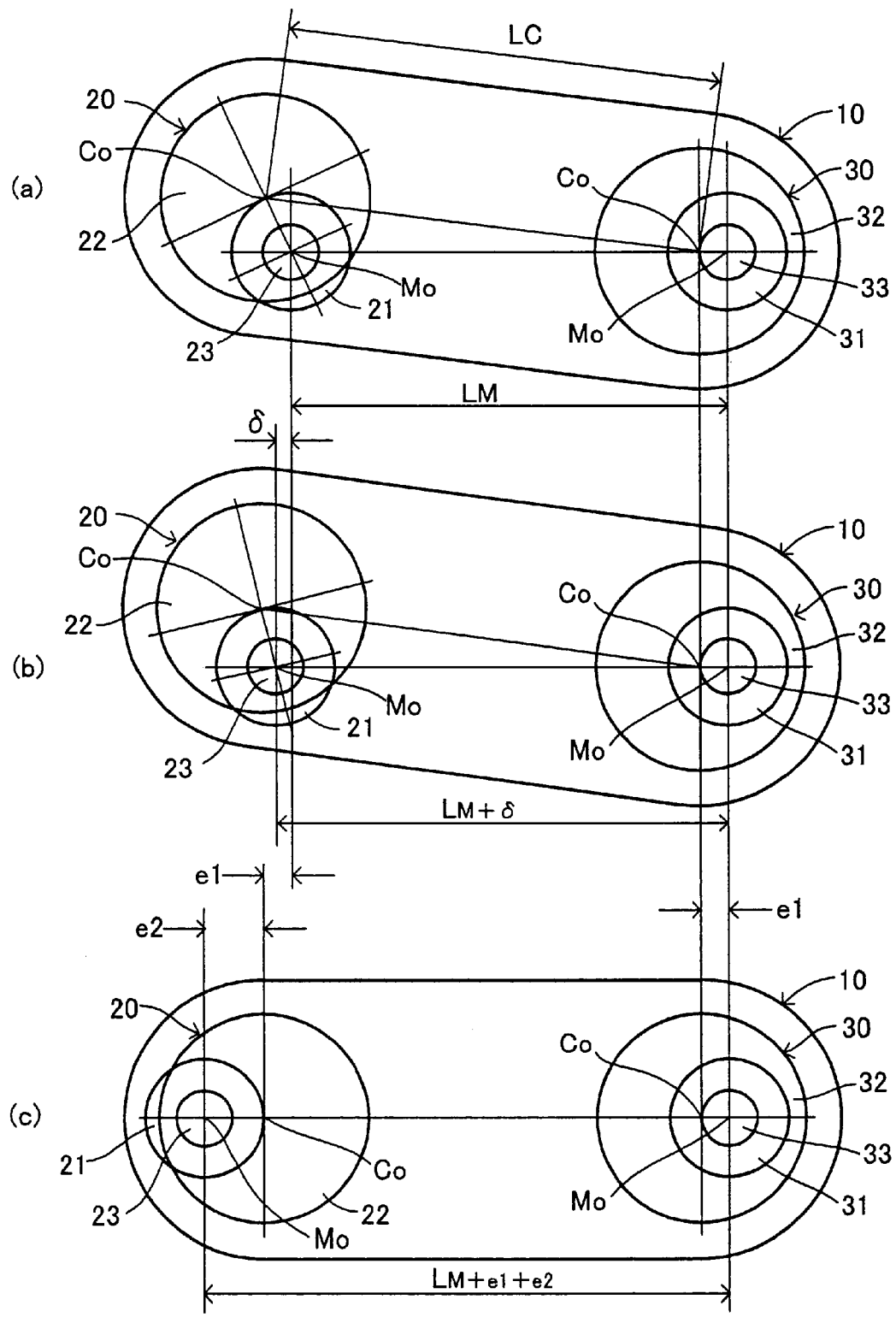
FIG. 5 is an explanatory view of a disc brake shown in FIG. 1, reversing the eccentric amounts on the left to right.

Further, in the disc brake A according to the present embodiment, the eccentric amount e1 at one pin sliding means 20 is set different from the eccentric amount e2 in the other pin sliding means 30. Therefore, when the pitch LM between both installation holes 41a, 42a in the mounting 40 changes due to deformation δ of the mounting 40 generated during braking, the caliper 10 can be moved to one side in the diametrical direction of the rotor with respect to the mounting 40 (see (a) and (b) of FIG. 4.) Hence, by properly setting the eccentric amounts e1, e2 at each pin sliding means 20, 30, respectively, (for example, as schematically shown in (a) and (b) of FIG. 5, reversing the eccentric amounts on the left to right) the behavior of the caliper 10 with respect to the mounting 40 during braking can be properly set.

Further, in the disc brake A according to the present embodiment, the installation holes 11a, 12a of the caliper 10 are brought contact with the collars 22, 32 of the pin sliding means 20, 30 in a circular line. Therefore, it is possible to move the caliper 10 to one side at the collars 22, 32 of the pin sliding means 20, 30 and absorb both the dimensional tolerance and deformation by braking in the direction of twist (i.e. the direction in which the caliper 10 is twisted by braking force). Therefore even if the caliper 10 is pulled along with braking in the rotational direction of the rotor, no major twist is generated at each pin sliding means 20, 30, such that smooth sliding at the pin sliding means 20, 30 is ensured.

In the foregoing, the present invention is embodied in such a way that the eccentric amount e1 of one of the pin sliding means 20 is set different from the eccentric amount e2 at the pin sliding means 30. However, the present invention may be embodied in such a manner that the eccentric amount at one pin sliding means 20 is set the same (to e) as that of the eccentric amount of the other pin sliding means 30, as schematically shown in FIG. 6.

Figure 6:
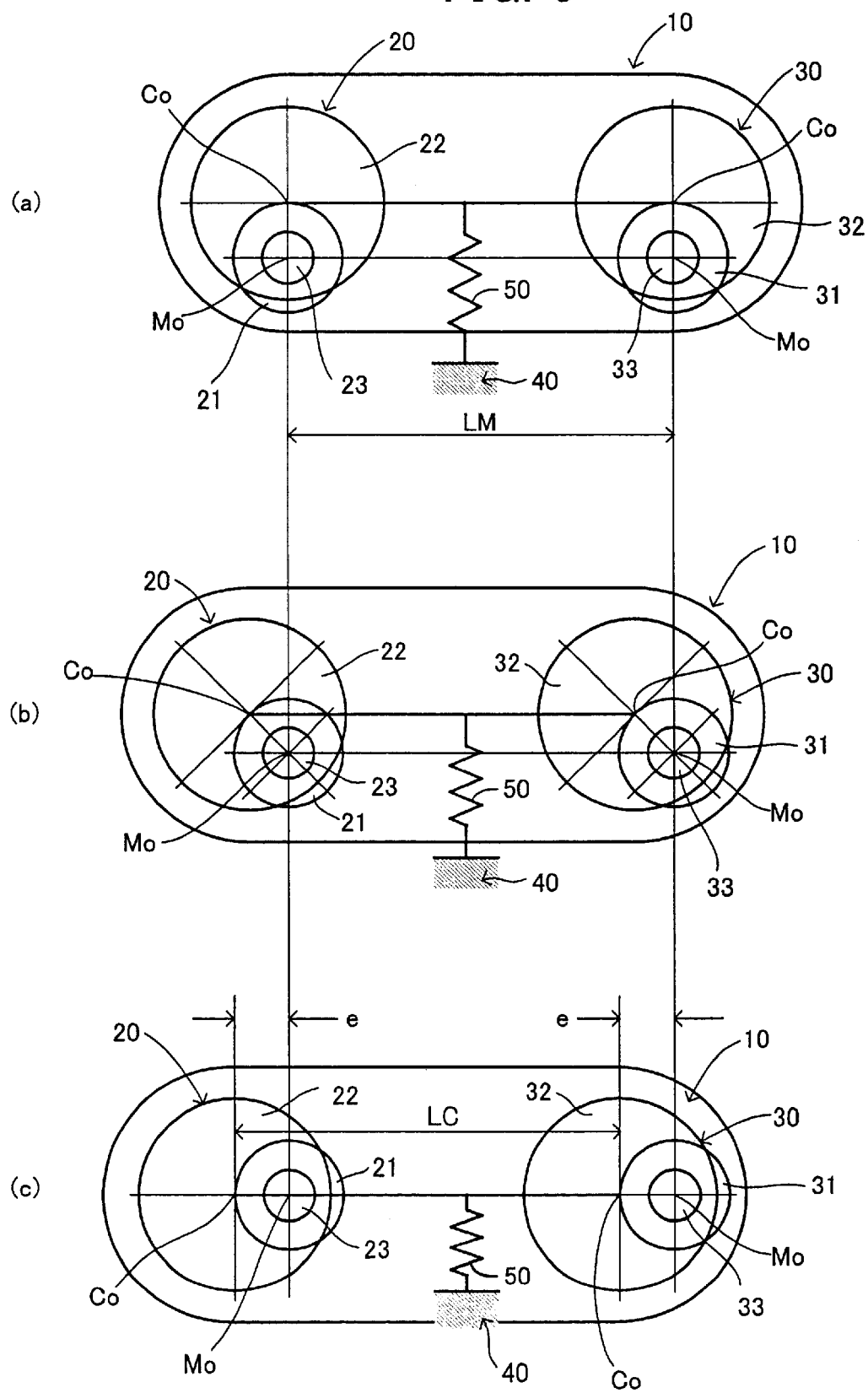
FIG. 6 is an explanatory view of action of another embodiment of the disc brake according to the present invention (in which the eccentric amounts are the same with both pin sliding means and a spring is interposed between the mounting and the caliper).

In an embodiment as shown in FIG. 6, a spring (which may be replaced with other urging means) for urging the caliper 10 in the diametrical direction of the rotor is interposed between the mounting 40 and the caliper 10. Therefore, in this embodiment, the caliper 10 can be urged in the diametrical direction of the rotor with respect to the mounting 40, and the initial position (i.e. a position where no braking is applied) can be prescribed. Accordingly, the behavior of the caliper 10 during braking can be stabilized and consistent braking force can be obtained.

In the aforementioned embodiment, in each pin slide means 20, 30, the slide pins 21, 31 and the collars 22, 32 are formed separately, however, they can be formed integrally. Also, in the aforementioned embodiment, the installation holes 11a, 12a in the caliper 10 are brought into contact with the collars 22, 32 of the pin sliding means 20, 30 in a circular line. However, it may also be possible that the installation holes in the caliper are brought with contact with the collars of each pin sliding means in a cylindrical surface shape.

What is claimed is:

1. A disc brake in which a caliper is supported by a mounting slidably in an axial direction of a rotor via a pair of pin sliding means, wherein the pin sliding means is such that a caliper side axial portion mounted in an installation hole in the caliper rotatably and integrally movable in the axial direction is off-centered from a mounting side axial portion fitted into an installation hole in the mounting rotatably and slidably in the axial direction.

2. A disc brake according to claim 1, wherein an eccentric amount at one of the pin sliding means is different from that at another pin sliding means.

3. A disc brake according to claim 1, wherein the installation hole in the caliper is brought into contact, in a circular line, with the caliper side axial portion of the pin sliding means.

4. A disc brake according to claim 2, wherein the installation hole in the caliper is brought into contact, in a circular line, with the caliper side axial portion of the pin sliding means.

5. A disc brake according to claim 1, further comprising urging means for urging the caliper in a diametrical direction of the rotor.

6. A disc brake according to claim 2, further comprising urging means for urging the caliper in a diametrical direction of the rotor.

7. A disc brake according to claim 3, further comprising urging means for urging the caliper in a diametrical direction of the rotor.

8. A disc brake in which a caliper is supported by a mounting slidably in an axial direction of a rotor via a pair of pin slide means, wherein the pin sliding means comprises:
    a caliper side axial portion fitted into an installation hole in the caliper rotatably;
    a mounting side axial portion fitted into an installation hole in the mounting rotatably and slidably in the axial direction and,
    a connecting portion for integrally connecting the caliper side axial portion and the mounting side axial portion, and
    wherein an axis of the caliper side axial portion is eccentric with an axis of the mounting side axial portion.

9. A disc brake according to claim 8, wherein both of axes of the caliper side portions are eccentric with both of axes of the mounting side axial portions, respectively.

* * * * *